US011833629B2

(12) United States Patent
Carrolo et al.

(10) Patent No.: US 11,833,629 B2
(45) Date of Patent: Dec. 5, 2023

(54) CASSETTE FED AUTOMATED CLIP APPLICATION SYSTEM

(71) Applicant: Aptiv Technologies Limited, St. Michael (BB)

(72) Inventors: Nuno José Lopes Carrolo, Lisbon (PT); Marco Ruben Medeiros Ferreira da Silva, Odivelas (PT); Pedro Matias, Lisbon (PT); Emanuel Martins Carvalho, Feijo (PT)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/103,686

(22) Filed: Jan. 31, 2023

(65) Prior Publication Data

US 2023/0241729 A1    Aug. 3, 2023

(30) Foreign Application Priority Data

Jan. 31, 2022   (GB) .................................... 2201211

(51) Int. Cl.
  *B23P 19/00*   (2006.01)
  *B23P 19/04*   (2006.01)
  *B62D 65/02*   (2006.01)

(52) U.S. Cl.
  CPC .......... *B23P 19/002* (2013.01); *B23P 19/001* (2013.01); *B23P 19/004* (2013.01); *B23P 19/007* (2013.01); *B23P 19/04* (2013.01); *B23P 2700/50* (2013.01); *B62D 65/02* (2013.01)

(58) Field of Classification Search
  CPC ..... B23P 19/001; B23P 19/002; B23P 19/004; B23P 19/006; B23P 19/007; B23P 19/04; B23P 2700/50; B21J 15/32; B25J 11/005; B25J 11/007; B62D 65/02
  See application file for complete search history.

(56) References Cited

U.S. PATENT DOCUMENTS 4,971,647 A * 11/1990 Leslie ................... F16B 11/006
                                                            156/542
2019/0337103 A1   11/2019 Russo et al.

FOREIGN PATENT DOCUMENTS

| DE | 102017220660 A1 | 5/2019 |
| DE | 102019125999 A1 * | 4/2021 |
| JP | H02124230 A | 5/1990 |
| JP | 2017047516 A | 3/2017 |

OTHER PUBLICATIONS

Search Report for Application No. GB2201211.6; dated Jul. 12, 2022; 1 page.

* cited by examiner

*Primary Examiner* — Matthew P Travers
(74) *Attorney, Agent, or Firm* — Billion & Armitage

(57) ABSTRACT

An automated clip application system for fitting clips in an automotive assembly line includes a cassette receiving station for receiving at least one cassette preloaded with a plurality of clips. The clips in the cassette are arranged in the same orientation. A dispensing opening dispenses clips from the cassette one at a time, and a robotic member is programmed to pick up the clips, one at a time, after they have been dispensed from the dispensing opening and fasten each clip in position in an automotive assembly.

11 Claims, 7 Drawing Sheets

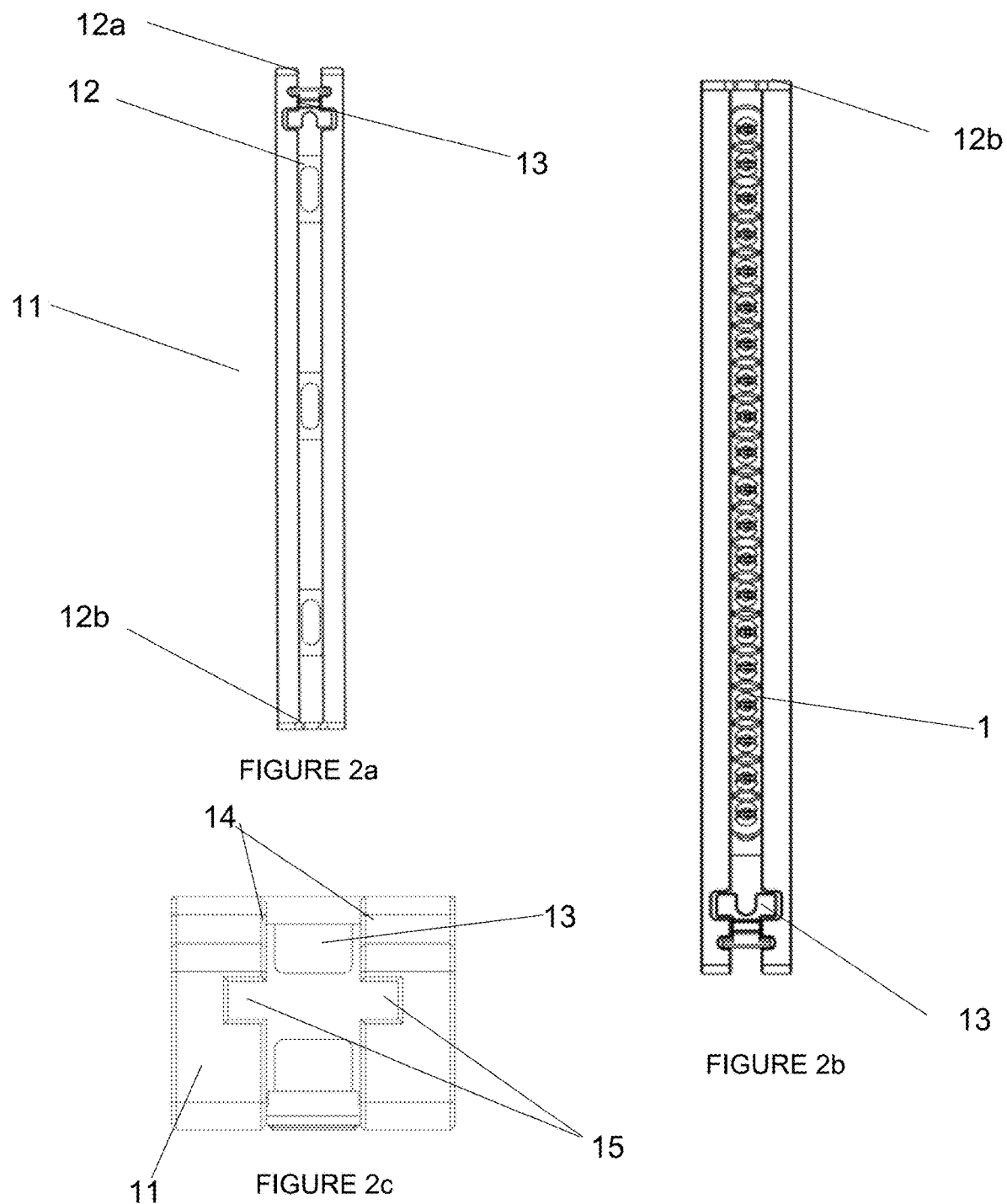

CASSETTE FED AUTOMATED CLIP APPLICATION SYSTEM

CROSS-REFERENCE TO RELATED APPLICATION

This application claims benefit of priority to United Kingdom Patent Application No. GB 2201211.6 filed on Jan. 31, 2022, the entire disclosure of which is hereby incorporated by reference.

TECHNICAL FIELD OF THE INVENTION

The present disclosure relates to improvements in relation to automated systems for applying wiring harness retaining clips during automotive assembly.

BACKGROUND

Retaining clips are used in vehicles to hold wiring harness in place to ensure they are correctly located and routed through bulk heads and the like, so they are not damaged or cut during use. This is achieved by use of robots which apply each clip in turn in the required position, but it is important that the robot fits each clip the correct way around and also in the correct orientation to enable automated securing of a wiring harness to the clip.
According to a system known in the prior art, this is achieved by each robot having a dedicated sorting system which is bulk fed with clips. In this prior art bowl feeding system, unsorted clips are received in a bowl from which they are fed into a sorting channel where they are manipulated into a set orientation before being fed to the robot. The robot is programmed to take a clip one at a time, the clips being presented in a consistent orientation so that the robot can be programmed with a consistent set of movements to fasten the clip in the correct position and orientation.
The prior art system has the drawbacks, however, that each robot must be equipped with the equipment to sort the clips, which equipment is both complex and expensive. This results in higher costs as well as increased maintenance time and costs and greater space taken up by the equipment.

SUMMARY

According to the present disclosure, there is provided an automated clip application system for fitting clips in an automotive assembly line, the system including a cassette receiving station for receiving at least one cassette, which, in use, is preloaded with a plurality of clips, each of the plurality of clips being arranged in the same orientation, a dispensing opening for dispensing the clips from the cassette, a grabbing member which is moveable between a first position in which it engages with the dispensing opening so as to grab a clip positioned at the dispensing opening, and a second position in which it is withdrawn from the end of the dispensing opening so as to position the grabbed clip spaced apart from the dispensing opening, and a robotic member programmed to pick up the clip from the grabbing member when it is in the second position and fasten the clip in position in an assembly.

An automated clip application system according to the present disclosure has the advantage that the use of a cassette-based feed system enables multiple robots to be reliably fed with clips in a fixed configuration and orientation from a single bowl feeder unit, reducing costs and space requirements and also increasing speed of operation. Furthermore, the use of a cassette to transport clips from a sorting system to the application system enables the clips to be manipulated, in particular, inverted prior to loading into the application system.

The grabbing member may include a pair of spring loaded jaws which are biased towards each other into as closed position, the jaws being urged apart against the biasing force of the spring loading when they are pressed against a clip as the grabbing member moves from its second position to its first position such that the clip engages between and is grabbed by the jaws and is retained therein as the grabbing member is withdrawn back to the second position. Alternatively, the jaws may be pneumatically or hydraulically opened and closed.

The system preferably includes a dispensing channel having a first end which aligns with a clip holding channel in a cassette which, in use, in mounted on the cassette receiving station, and a second end which aligns with the first position of the grabbing member, the grabbing member grasping clips one at a time from the second end of the dispensing channel.

A gate member is preferably provided at the second end of the dispensing channel for controlling the passage of clips out of the dispensing channel.

The grabbing member preferably grasps each clip by a bottom end thereof, which, in use, constitutes the end of the clip, which is inserted into a mounting opening, so that the other end is presented for engagement by the robotic member.

The, or each, cassette is preferably mounted on the cassette receiving section at an inclination such that an outlet end of each cassette is lowermost to effect gravity feeding of clips out of the cassette.

A plurality of cassettes is advantageously loaded onto the cassette receiving station in a vertically stacked arrangement, the cassette at bottom of the stack being aligned with a dispensing channel of the system along which can be translated into alignment with a dispensing opening for dispensing clips from the cassette at the first end. The other of the plurality of cassettes are preferably biased downwards such that upon removal of the cassette from the bottom of the stack, the remaining cassettes in the stack automatically move downwards to replace the removed cassette.

The present disclosure further provides a clip sorting assembly including a bowl feeder for receiving and sorting clips into a loading channel in a fixed orientation such that all clips in the loading channel are in the same orientation and configuration, a cassette loading station having a loading area for receiving an empty cassette in alignment with the loading channel for loading clips from the loading channel into the empty cassette, and a gate member associated with the loading channel for controlling passage of clips out of the loading channel into a cassette positioned in the loading area.

The cassette loading station is preferably sized and configured to receiving a plurality of cassettes in a vertical stack adjacent the loading area, the assembly further including an actuator for moving a cassette from the bottom of the vertical stack into the loading area, the plurality of cassettes being biased towards the bottom of the stack such that when a cassette is moved into the loading area, the adjacent cassette in the stack replaces it at the bottom of the stack.

The present disclosure still further provides a method of supplying clips to an automated clip application system, including sorting a plurality of clips using the clip sorting assembly according to the invention, loading the clips into a plurality of cassettes in the cassette loading station, inverting the plurality of cassettes, loading the inverted cassettes into the cassette receiving station of the automated clip application system of the present disclosure, and fitting the clips from the cassettes one at a time using the robotic member.

BRIEF DESCRIPTION OF THE DRAWINGS

The present invention is now described, by way of example with reference to the accompanying drawings, in which:

FIG. 1b is a side view of the retaining clip of FIG. 1a;

FIG. 2a is a top view of an empty cassette for use with the invention;

FIG. 2b is a top view of the cassette of FIG. 2a loaded with clips;

FIG. 2c is an end view of the cassette of FIG. 2a;

DETAILED DESCRIPTION

Figure 1A:
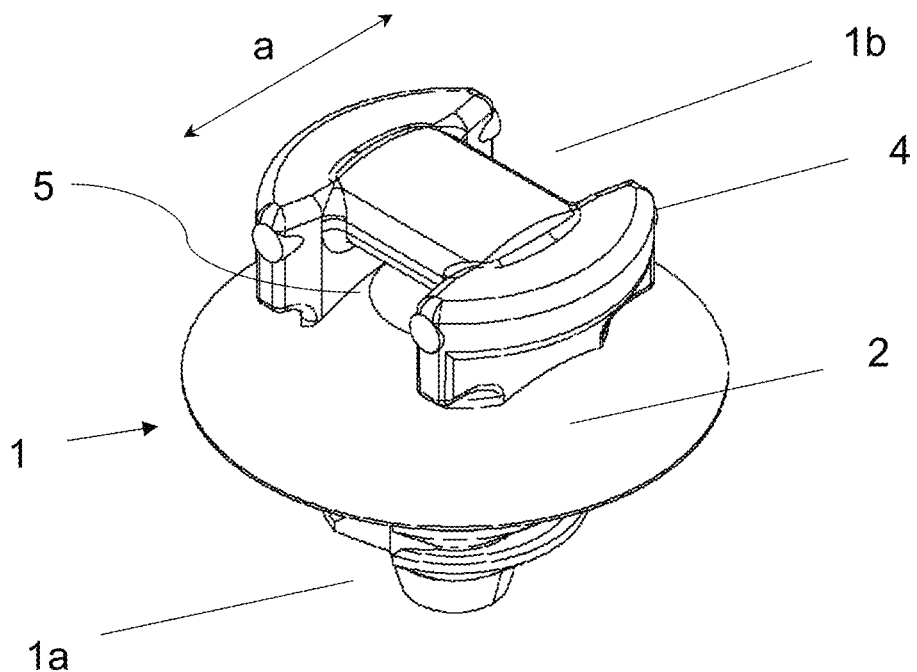
FIG. 1a is a perspective view of a retaining clip of the type which may be used with the present disclosure.

Referring first to FIG. 1a, there is shown a retaining clip, hereafter referred to as clip 1, of the type which can be used with the present disclosure, the clip 1 being known in the prior art. The clip 1 has a lower end 1a which, in use, is inserted into a complementary sized hole to secure the clip in place, and an upper end 1b which has a mounting structure 4 formed thereon by means of which cables and the like (not shown) can be secured to the clip in a well-known manner which will be not described in further detail here. A dome shaped cap 2 separates the upper and lower ends 1b, 1a, and acts as a stop to limit how far the lower end 1a can be inserted in a mounting hole. The lower end 1a has circumferential ribs 3 formed on its outer surface which are inclined away from the lower end 1a so as to facilitate insertion of the lower end 1a into a mounting hole but inhibit removal of the lower end 1a from a mounting hole in a well-known manner.

The mounting structure 4 on the upper end 1b of the clip 1 is formed by a pair of spaced apart pillars 4a, 4b which a bridging member 4c extending there between in spaced apart relation from the cap 2 so as to define a tunnel 5 between the mounting structure 4 and the cap 2 through which a retaining tie such as a cable tie may be looped. As can clearly be seen in FIG. 1a, the mounting structure 4 is longer than it is wider, which is important for the correct orienting of the clips as described below.

The top of the bridging member 4c is flat so that the clip 1 can settle in a stable orientation upside down resting with the flat top of the bridging member 4c lower most and the lower end 1a of the clip pointing upwards. The configuration of the clip is such that this is the most stable resting orientation of the clip and hence the one which the clip is most likely to adopt.

Figure 6:
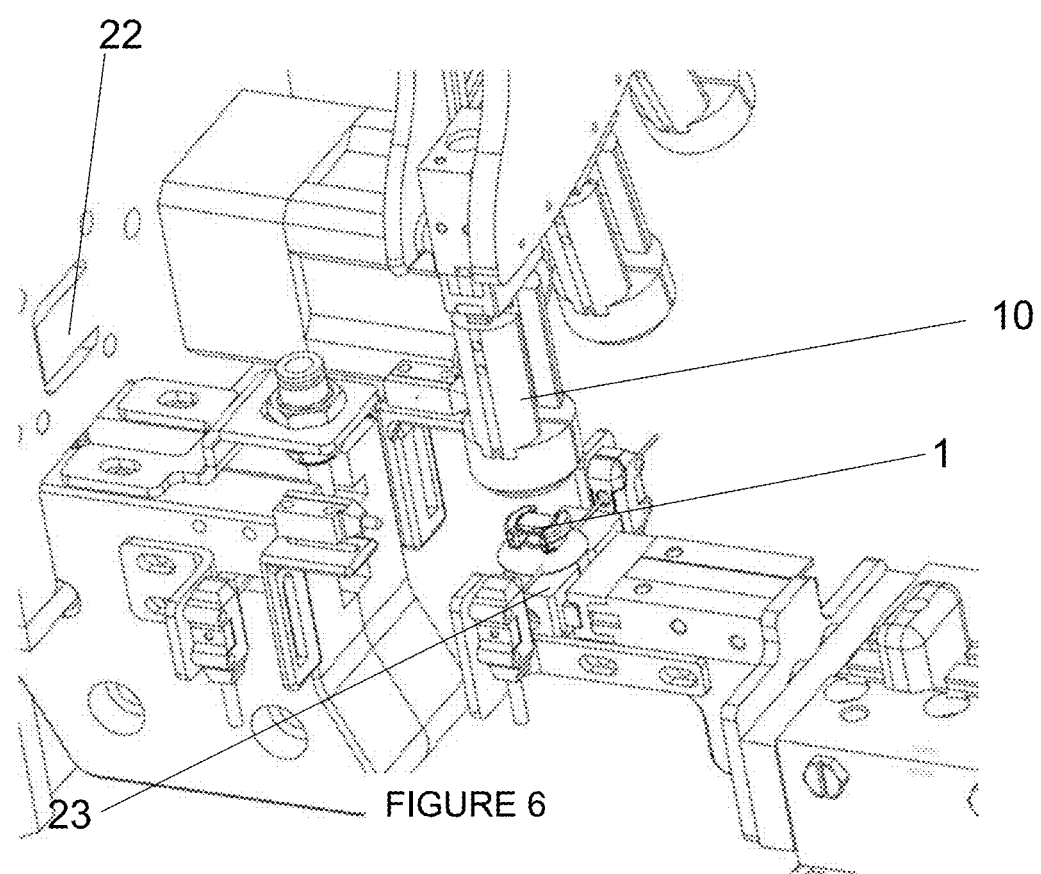
FIG. 6 is a top view of the part of the automated clip application system of FIG. 3 with a robotic member positioned to remove the clip from the grabbing member.
Figure 7:
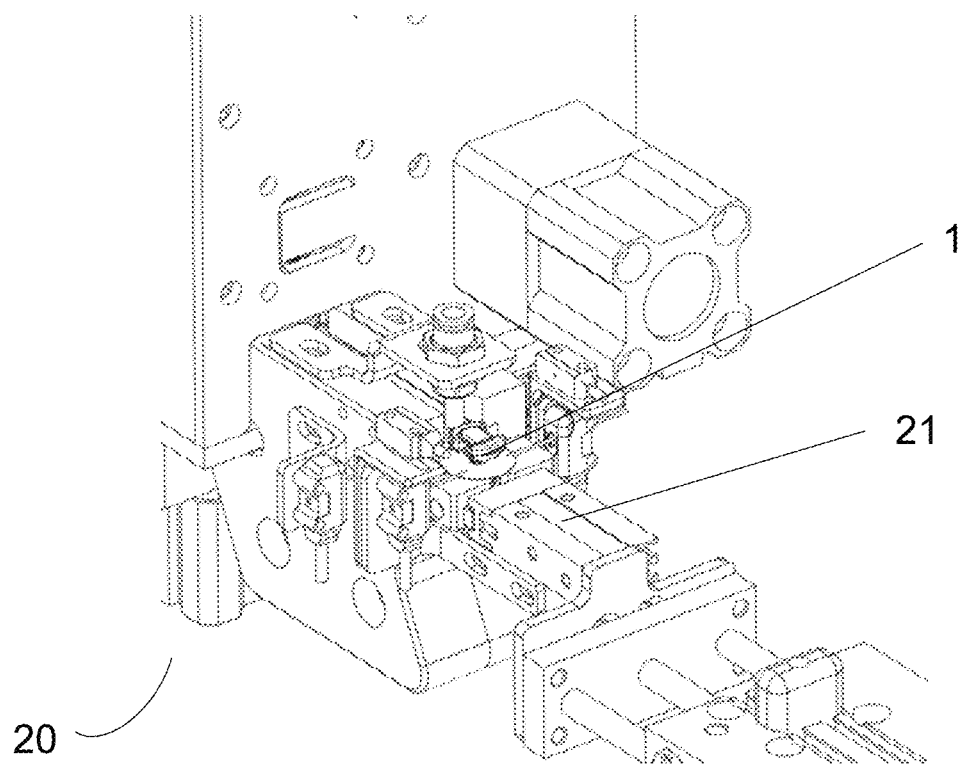
FIG. 7 is a first isometric view of the clip application system of FIG. 3 with the grabber member grabbing a clip in its first position.

The clips are applied in an automated process by means of robot arms 10, such as the one shown in FIG. 6, which pick up a clip 1 one at a time by grasping the mounting structure 4 on the upper end 1b of the clip and inserting the lower end 1a of the clip into a mounting hole in the correct rotational position so that the tunnel 5 in the clip is facing in the correct direction. Not only, therefore, is it important to ensure that the robot arm picks up each clip 1 by its mounting structure 4, but also to ensure that the clip 1 is in the correctly rotated about its longitudinal axis so that, in turn, it is inserted in position with the tunnel 5 correctly oriented.

Figure 1B:
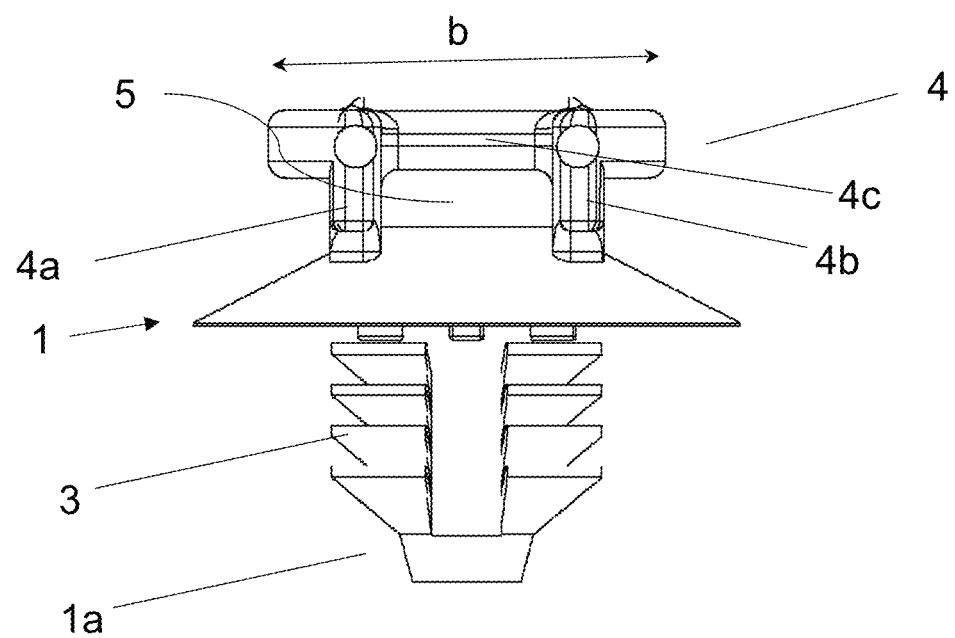
Figure 3:
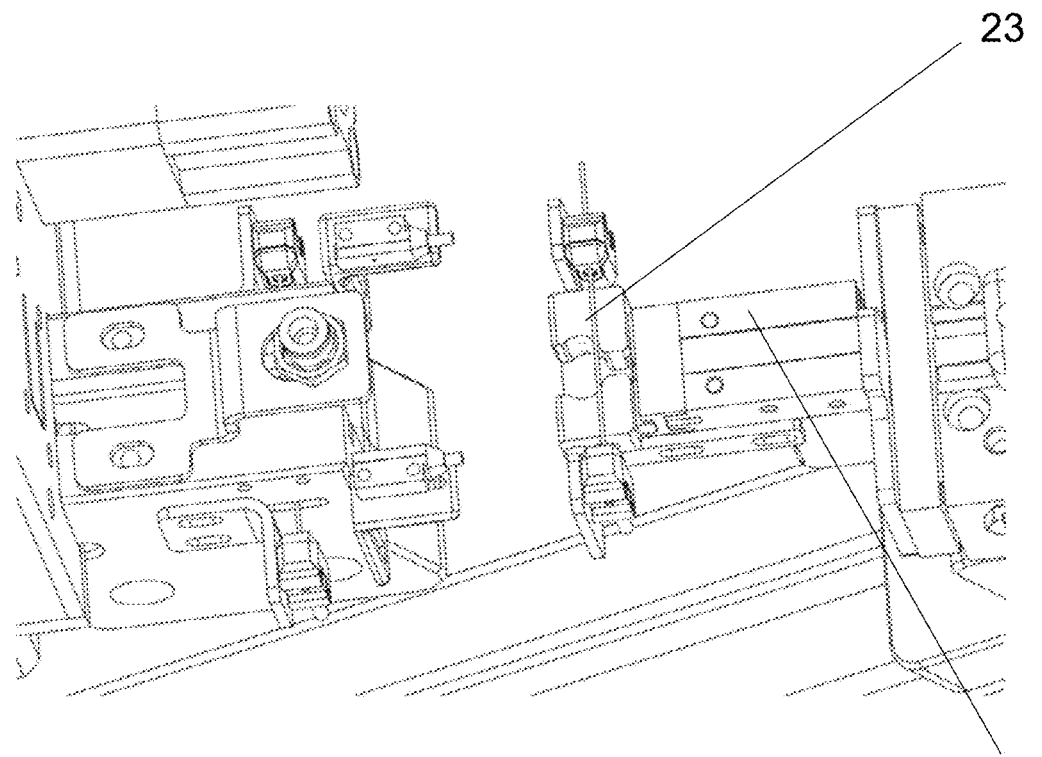
FIG. 3 is a top view of a part of the automated clip application system of the present disclosure with an empty grabber member in a second position.
Figure 4:
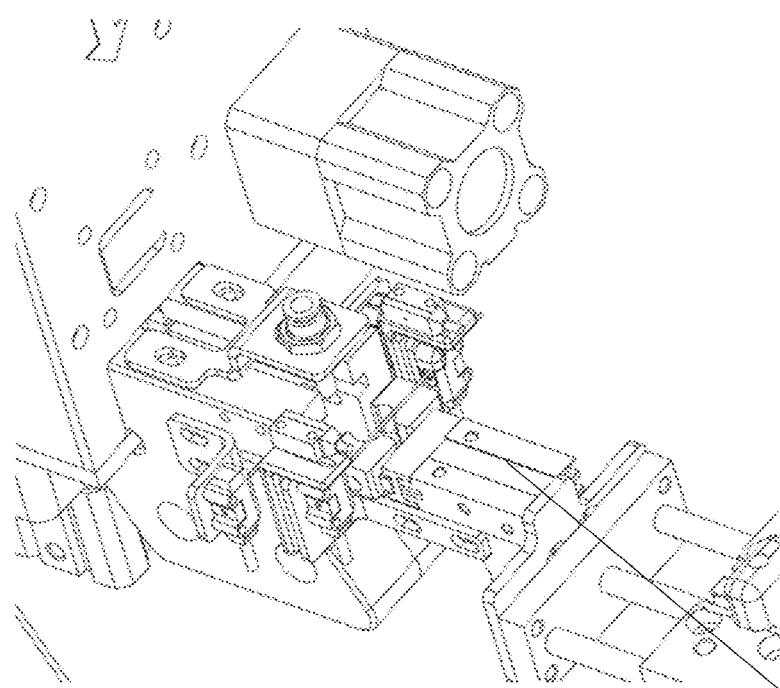
FIG. 4 is a top view of the part of the automated clip application system of FIG. 3 with the grabber member in a first position.
Figure 5:
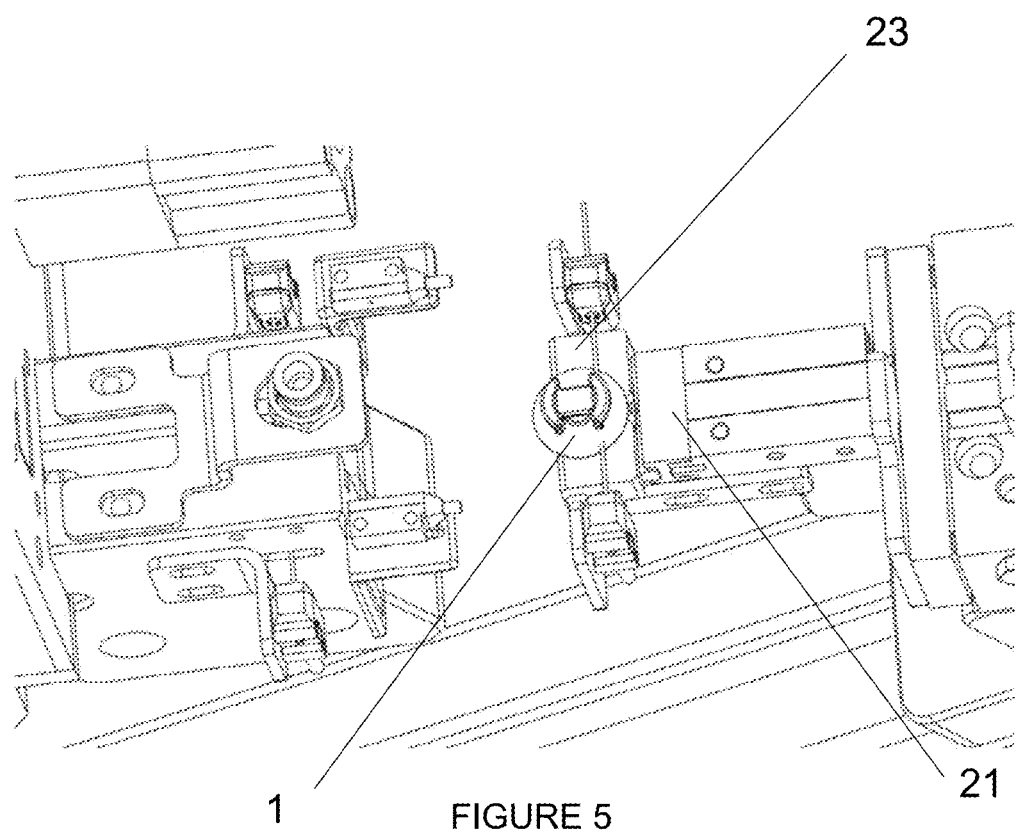
FIG. 5 is a top view of the part of the automated clip application system of FIG. 3 with the grabber member returned to the second position with a clip from the cassette.
Figure 10:
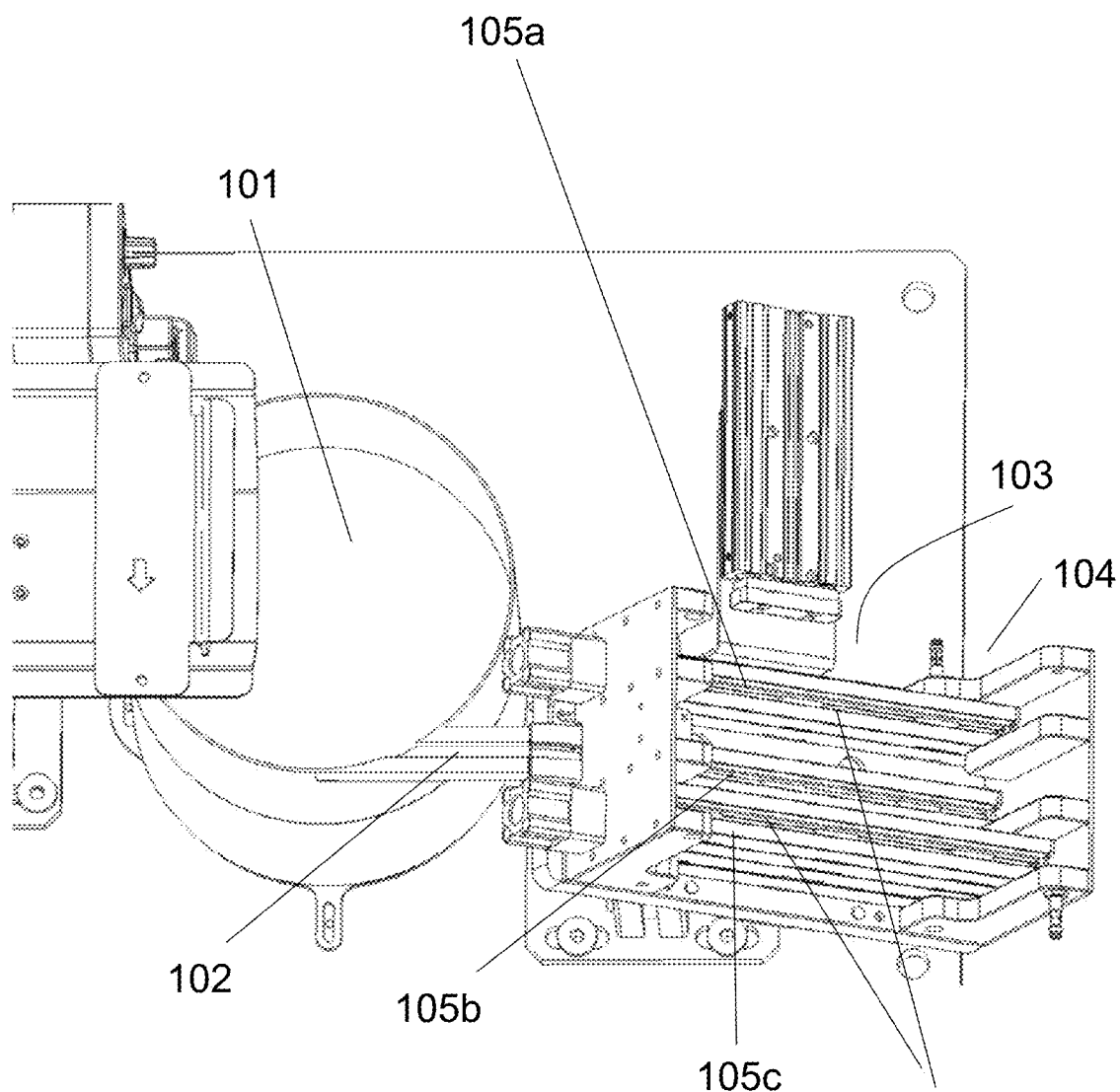
FIG. 10 is an isometric view of a bowl feeder with cassette loading system according to the invention.

In the present disclosure, similar to the prior art set out above, a bulk supply of clips is delivered to a sorting assembly, in particular a bowl feeder such as that shown in FIG. 10, which separates the clips into a single file line in a spiral channel around a clip bowl 101 or reservoir. The bowl and channel are subjected to vibration to agitate the clips to urge them into the most stable orientation described above— namely upside down resting with the flat top of the bridging member 4c lower most. As the clips progress along the spiral channel, they pass an obstruction in the channel which forms a constriction that is only just wide enough to allow a clip in the correct orientation to pass. The obstruction extends inwards from an outer wall of the channel so that each clip passing the constriction is urged towards an inner edge of the channel which has no barrier and hence which allows clips to fall off and return into the clip reservoir. Clips which are in the correct orientation are able to pass the obstruction without falling off the inner edge, whereas, due to the geometry of the clips, any clip which is not in the correct orientation will overbalance as it passes the constriction and toppling off the inner edge back into the clip reservoir. Once past the constriction, the clips are funnelled into an outlet channel 102 having a longitudinal groove in the bottom which is sized to interact with the mounting structure 4 on which each is lower most on the upside-down clips. As can be seen from FIGS. 1a and 1b, the width 'a' of the mounting structure is shorter than the length 'b', and the groove in the bottom of the outlet channel is sized to be a tolerance fit with the width 'a' of the mounting structure 4 of each clip such that a clip can only enter the outlet channel when it is oriented with its bridging member 4c aligned with the longitudinal axis of the outlet channel. The funnelled entrance of the outlet channel 102, which has a corresponding funnelled entrance to the outlet channel groove, develops a camming action with the outer edges of the mounting structure 4 such that any clip which does not already have its mounting structure 4 correctly aligned is caused to rotate into the correct orientation as it enters the outlet channel. Such sorting systems are well known in the art and will not be described in further detail here.

In difference to the prior art approach of a single sorting assembly feeding an individual robot, according to the present disclosure, the outlet channel 102 of the sorting assembly feeds to a cassette filling station 103 where the sorted and aligned clips 1 are loaded into cassettes 11 such as shown in FIGS. 2a to 2c. Each cassette 11 has a holding channel 12 which has a profile similar to the profile of the outlet channel of the sorting assembly so that the orientation and alignment of the clips 1 in the outlet channel is maintained as the clips pass from the outlet channel into the loading channel 12 and are held therein. A gate is provided at the end of the outlet channel to control the passage of clips, the gate being open to allow clips to pass into the loading channel of an empty cassette 11 once it is positioned in line with the outlet channel before being closed once the cassette is full, allowing the full cassette to be removed and replaced with an empty one. Each cassette similarly includes a gate 13 at least at one end of its loading channel which controls the entry and exit of clips therethrough, the gate closing once loading is complete to prevent clips falling out of the loading channel during transport of the cassette. In the illustrated embodiment, the clips are loading and unloaded (as described below) from the same end 12a of the loading channel 12 with the other end 12b being closed, and the gate 13 in the cassette takes the form of a plastic clip which is removably inserted into the end of the loading channel 12. However, in an alternative embodiment, a gate may be provided at each end of the channel to allow loading and dispensing from opposite ends of the loading channel.

As can be seen from FIG. 2c, the width of the loading channel of the cassette is reduced at the top of the channel by opposing flanges 14 which extend inward from the tops of the side walls of the loading channel so as to overlap the cap 2 of the clips to form undercuts 15 in which the opposing sides of the caps 2 engage, thereby preventing the loaded clips falling out of the top of the loading channel 12 during transport of the cassette 11.

It will be understood that the sorting assembly may be provided with multiple outlet channels, all fed from the same bowl channel, thereby allowing multiple cassettes to be filled simultaneously.

In order to maximise efficiency, the cassette filling station 103 includes a cassette storage area 104 adjacent the outlet channel 102 which can receive multiple empty cassettes 11 stacked vertically one on top of the other to form an empty cassette stack 105a. The bottom cassette 11 in the empty cassette stack 105a is moved to a filling position 105b in alignment with the outlet channel 102 where it is loaded with clips 1 before being moved on to a filled cassette stack 105c where the filled cassettes are similarly stacked one on top of the other with each newly filled cassette 11 being added to the bottom of stack. The weight of the empty cassettes 11 in the empty stack causes the cassettes to drop each time one is removed for filling, although other options are possible such as spring biasing spring, hydraulic actuator or the like. IN this way, once a cassette is removed from the empty cassette stack 105a into the filling position 105b, the adjacent cassette automatically replaces it in the filling position. The cassettes are moved by a pneumatic actuator or the like.

The stack of filled cassettes 11 is then moved to a dispensing station 20 adjacent a fitting robot, shown in FIGS. 3 to 9, for fitting as follows:

The dispensing station 20 includes a cassette receiving area 22 for receiving multiple filled cassettes 11 one on top of the other in a vertical stack. The receiving area is divided into two sections—a filled stack section 22a shown on the left side in FIGS. 8 and 9, and an empty stack section 22b shown on the right side in FIGS. 8 and 9. The cassette at the bottom of the filled stack section 22a locates in a dispensing station 22c from which clips 1 can be dispensed from the cassette as described below. Once the bottom cassette has been emptied of clips 1, a pneumatic actuator (not shown) takes the cassette from the dispensing station 22c at the bottom of the filled stack section 22a and moves it to the empty stack section 22b where the existing stack is lifted and the newly emptied cassette 11 added to the bottom.

It will be understood from the above description that the cassettes 11 are filled with the loading channel oriented such that the clips 1 are loaded into the loading channel 12 upside down, that is with the mounting structure 4 lower most and the insertion end 1a of the clips pointing upwards. In order to facilitate the correct presentation of the clips to the fitting robot 10, the cassettes 11 are loaded into the cassette receiving area 22 of the dispensing station 20 the opposite way up, that is with the insertion end 1a of the clips 1 lowermost so that mounting structure 4 of each clip is uppermost, each clip 1 being suspended by the engagement of its cap 2 with the longitudinal flanges 14 which project into the loading channel 12 from either side as described above.

Figure 8:
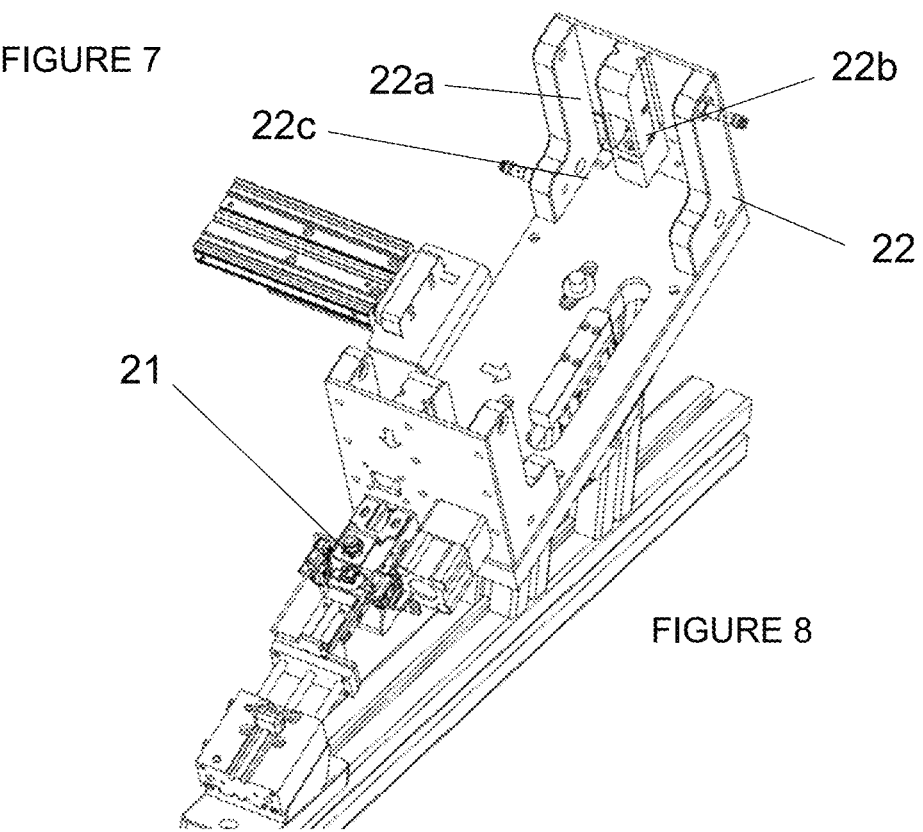
FIG. 8 is a second isometric view of the system of FIG. 7.
Figure 9:
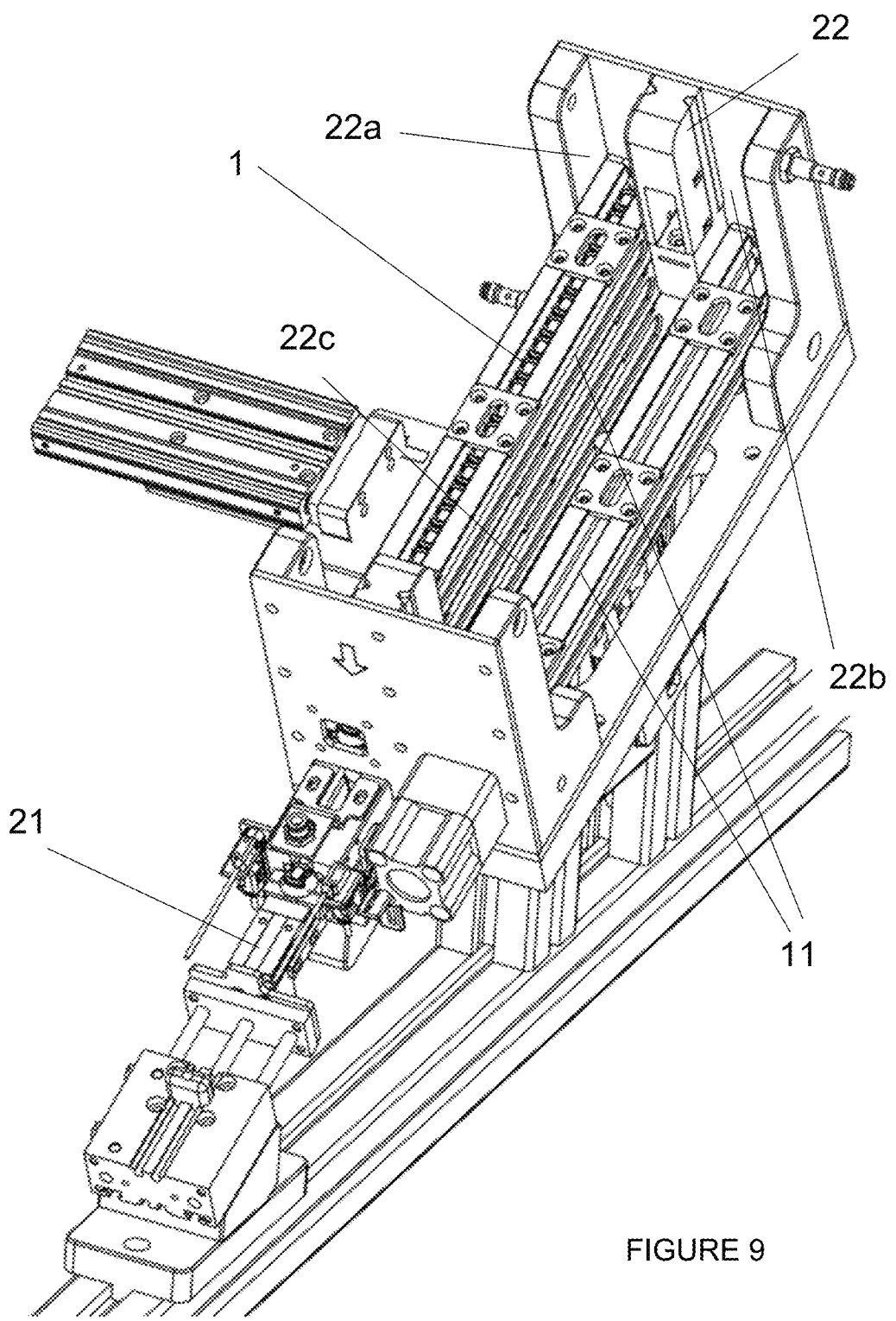
FIG. 9 is a third isometric view of the system of FIG. 7 loaded with full and empty cassettes.

As shown in FIGS. 8 and 9, the cassettes 11 rest on the cassette receiving area 22 at an inclined angle such that the outlet end is lowermost and hence the clips 1 are urged towards the outlet end under gravity.

Due to the manner in which the clips 1 are loaded into the cassettes 11, there will usually be some random overlap between the caps 2 of adjacent clips, the cap of one clip 1 either overlying or underlying the caps 2 of the adjacent clips on either side. It was found that this could cause obstruction to the clean pick up of the end clip by the robot. In order to overcome this, the dispensing station 20 includes a gripper 21 which is disposed adjacent the outlet end 12a of the loading channel 12 of the cassette 11. The gripper 21 has a pair of pneumatically actuated jaws 23 which are pneumatically moved from a closed position to an open position to allow the jaws 23 to be pressed around the ribs 3 of the lower end 1a of a clip in order to grasp it between the jaws 23. The gripper is then pneumatically actuated to move from a second position (see FIG. 3) to a first position (see FIG. 4) in which it is located adjacent the end 12a of the loading channel 12, the jaws 23 engaging the clip 1 which is adjacent thereto so as to grasp the clip 1. The gripper 21 is then withdrawn back to its second position, withdrawing with it the clip 1 held within its jaws 23 so as to move the clip 1 into a position clear of the cassette 11 and dispensing station from which it can easily be picked up by the robot arm 10 for attaching in place. This process is repeated each time the robot arm 10 removes a clip 1 from the gripper 21 so that a continuous supply of clips 1 is available to the robot arm.

Once the cassette 11 in the dispensing station 22C is empty, it is slid to the right (see FIG. 8) to the empty stack section 22B where it is added to the bottom of the empty stack, allowing the next full cassette 11 to take its place and the process to continue.

It will be understood from the foregoing that the use of the cassette-based feed system of the present disclosure enables a single, suitably sized sorting system, to be used to supply multiple fitting robots. Also, the use of a cassette to transport the sort clips enables the clips easily to be inverted once they have been loaded, facilitating the further handling of the clips by the robot. Whilst the present disclosure has been described in connection with a pneumatic based system, it will be understood that other actuation systems such as hydraulic systems may also be used.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An automated clip application system for fitting clips in an automotive assembly line, the system comprising:

a cassette receiving station for receiving at least one cassette, which, in use, is preloaded with a plurality of clips, each of the plurality of clips being arranged in the same orientation;
a dispensing opening for dispensing the clips from the cassette;
a grabbing member which is moveable between a first position in which it engages with the dispensing opening so as to grab a clip positioned at the dispensing opening, and a second position in which it is withdrawn from an end of the dispensing opening so as to position the grabbed clip spaced apart from the dispensing opening; and
a robotic member programmed to pick up the clip from the grabbing member when it is in the second position and fasten the clip in position in an assembly.

2. The automated clip application system according to claim 1, wherein the grabbing member comprises a pair of jaws which are actuatable to move between a closed position and an open position, the grabbing member being configured to move from its second position to its first position with the jaws open such that a clip in the dispensing opening engages between the jaws, the jaws then being closable around the clip to retain it therein as the grabbing member is withdrawn back to the second position.

3. The automated clip application system according to claim 2, wherein the jaws are pneumatically actuated to move between the open and closed positions.

4. The automated clip application system according to claim 1, further including a dispensing channel having a first end which aligns with a clip holding channel in a cassette which, in use, is positioned at a clip dispensing station of the system, and a second end which forms the dispensing opening.

5. The automated clip application system according to claim 4, further including a gate member at the second end of the dispensing channel for controlling passage of clips out of the dispensing channel.

6. The automated clip application system according to claim 1, wherein the grabbing member is configured to grab each clip by a bottom end thereof, which, in use, constitutes an end of the clip, which is inserted into a mounting opening, so that another end is presented for engagement by the robotic member.

7. The automated clip application system according to claim 1, wherein the, or each, cassette is mounted on a cassette receiving section at an inclination such that an outlet end of each cassette is lowermost to effect gravity feeding of clips out of the cassette.

8. The automated clip application system according to claim 1, further comprising a plurality of cassettes loaded onto the cassette receiving station in a vertical stack one on top another, cassette at the bottom of the stack being aligned with the dispensing opening such that clips can be dispensed from the cassette.

9. The automated clip application system according to claim 8, wherein remaining cassettes are biased downwards such that upon removal of the cassette from the bottom of the stack, an adjacent cassette automatically moves to the bottom of the stack and into alignment with the dispensing opening.

10. The automated clip application system according to claim 8, wherein the cassette receiving station further includes an empty cassette stacking section, the cassette aligned with the dispensing opening being moveable therefrom to the empty cassette stacking station where emptied cassettes are stacked one on top of another in a vertical stack.

11. A method of supplying clips to a mated clip application system, comprising:
- sorting a plurality of clips using a clip sorting assembly having:
  - a feeder for receiving and sorting clips into a loading channel in a fixed orientation such that all clips in the loading channel are in the same orientation and configuration,
  - a cassette loading station having a loading area for receiving an empty cassette in alignment with the loading channel for loading clips from the loading channel into the empty cassette, and
  - a gate member associated with the loading channel for controlling passage of clips out of the loading channel into the empty cassette positioned in the loading area;
- loading the clips into a plurality of cassettes in the cassette loading station, inverting the plurality of cassettes,
- loading the inverted cassettes into a cassette receiving station of an automated clip application system having:
  - the cassette receiving station for receiving at least one cassette, which, in use, is preloaded with a plurality of clips, each of the plurality of clips being arranged in the same orientation,
  - a dispensing opening for dispensing the clips from the cassette,
  - a grabbing member which is moveable between a first position in which it engages with the dispensing opening so as to grab a clip positioned at the dispensing opening, and a second position in which it is withdrawn from an end of the dispensing opening so as to position the grabbed clip spaced apart from the dispensing opening, and
  - a robotic member programmed to pick up the clip from the grabbing member when it is in the second position and fasten the clip in position in an assembly; and
- fitting the clips from the cassettes one at a time using the robotic member.

* * * * *

UNITED STATES PATENT AND TRADEMARK OFFICE
CERTIFICATE OF CORRECTION

| | |
|---|---|
| PATENT NO. | : 11,833,629 B2 |
| APPLICATION NO. | : 18/103686 |
| DATED | : December 5, 2023 |
| INVENTOR(S) | : Nuno José Lopes Carrolo et al. |

Page 1 of 1

It is certified that error appears in the above-identified patent and that said Letters Patent is hereby corrected as shown below:

On the Title Page

(71) Applicant should read "Aptiv Technologies AG, Schaffhausen (CH)".

Signed and Sealed this
Third Day of June, 2025

Coke Morgan Stewart
*Acting Director of the United States Patent and Trademark Office*